June 23, 1931.  H. C. HEBIG  1,811,468
MOTOR HEAT INDICATOR
Filed Feb. 10, 1928  2 Sheets-Sheet 1
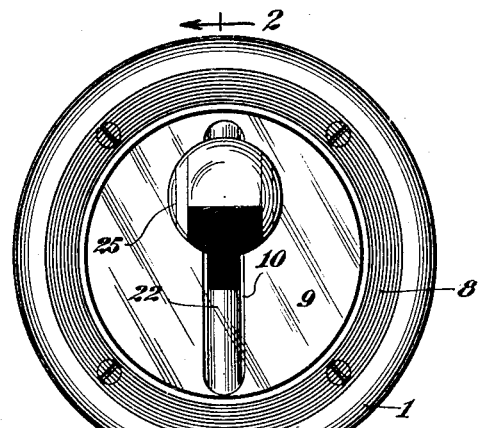
Fig. 1
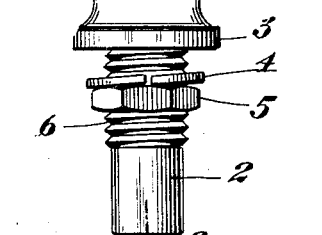
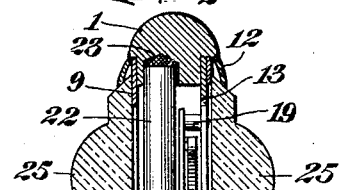
Fig. 2
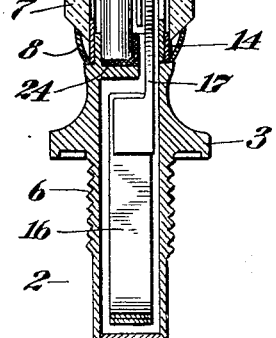
INVENTOR
Henry C. Hebig June 23, 1931.  H. C. HEBIG  1,811,468
MOTOR HEAT INDICATOR
Filed Feb. 10, 1928  2 Sheets-Sheet 2

INVENTOR
Henry C. Hebig,
ATTORNEYS

Patented June 23, 1931

1,811,468

UNITED STATES PATENT OFFICE

HENRY C. HEBIG, OF HOFFMANS, NEW JERSEY, ASSIGNOR TO HARRISON HURLBERT BOYCE, OF JERICHO, NEW YORK

MOTOR HEAT INDICATOR

Application filed February 10, 1928. Serial No. 253,297.

This invention relates to devices for indicating the heat condition within the cooling systems of internal combustion engines and especially internal combustion engines of the automotive type.

One of the objects of this invention is to provide a novel magnifying means for the indication of the heat condition within an automotive engine.

Another object of this invention is to provide a cylindrical magnifying means for the entire range of indication of the heat condition within an automotive engine cooling system and an additional means for accentuating the indication throughout that portion of said indication which corresponds to a dangerous heat condition within said cooling system.

Another object of this invention is to provide a combined convex and cylindrical magnifying means for that portion of an indicating element of a device for indicating the heat condition within an automotive radiator which corresponds to the indication of a dangerous heat condition within said radiator.

Another object of this invention is to provide a mechanical indication of the heat condition within an automotive radiator and means to magnify the indication by said mechanical means throughout the entire range of indication and an additional means for further magnifying the indication throughout a given portion of the indicating range.

Another object of this invention is to provide an indicating element in the form of a semaphore for indicating the heat condition within an automotive radiator and means extending across the path of swinging movement of said semaphore for magnifying the indication by said semaphore.

Another object of this invention is to provide a mechanically operated visual indication of the heat condition within an automotive radiator and a cylindrical means for magnifying the indication throughout the entire range and means for concentrating light rays upon that portion of the indicating range which corresponds to a dangerous heat condition within said automotive radiator and a convex means for further magnifying the indication throughout the range upon which light rays are concentrated.

Another object of this invention is to provide in a mechanically operated visual indicator, a magnifying means which will disclose the indication as bounded by horizontal lines even though the indicating element traverse said means at an angle.

Other objects and advantages of this invention will become apparent from the following specification, claims and appended drawings, in which:—

Fig. 1 is a front elevational view of my device.

Fig. 2 is a cross-sectional view on the line 2—2 of Fig. 1.

Figure 3:
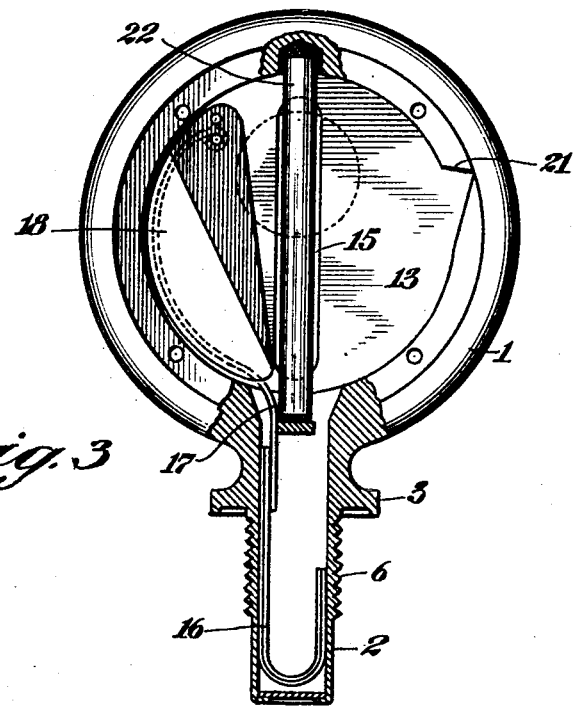
Fig. 3 is a front elevational view of my device with parts shown in section.

Referring to the drawings, my device consists of a casing 1 having integrally formed therewith a downwardly projecting hollow stem 2. A base flange 3 is formed integral with the casing 1 and the hollow stem 2 at the upper end of said hollow stem.

My device is adapted to be attached to a radiator cap or closure device (not shown in the drawings) with the hollow stem 2 projecting through an aperture in said cap and the flange 3 resting against the outer surface of said cap. A lock washer 4 and lock nut 5 cooperating with a threaded portion 6 of the stem 2 are provided for the purpose of securing my device to said cap. The front side of the casing 1 is closed by a bezel 7 secured in place by a retaining ring 8 as is customary in devices of this type. A dial 9 is positioned between the bezel 7 and the casing 1 and is provided with a vertical extending slot 10. The rear face of the casing 1 is closed by a bezel 11 secured in place by a retaining ring 12 as is clearly shown in Fig. 2. A rear dial 13 is provided between the bezel 11 and the casing 1 and is separated from the bezel 11 by a gasket 14. The rear dial 13 is provided with a slot 15 similar to the slot 10 in the front dial 9 and substantially coextensive and in line therewith.

The slots are shown as perpendicular in the drawings but I do not wish to limit myself in this respect as it is obvious that they may extend in any desired direction. A heat responsive element 16 such as a thermostatic device is mounted within the hollow stem 2 and is provided with an upwardly extending arm 17 which projects within the casing 1 in close proximity to the rear dial 13 and is secured at its upper end by a pivotal connection to a semaphore 18 pivotally mounted upon the rear dial 13. A spacing washer 19 is provided around the pivotal mounting and serves to space the semaphore 18 from the rear dial 13 sufficiently to permit the arm 17 to lie therebetween and have sufficient working clearance. The semaphore 18 is preferably formed of a transparent or translucent substance such as a celluloid, bakelite, or glass and is segmental in shape, the outer curve of the segment being shown as substantially that of the inner curve of the casing 1. I do not desire in this respect however, to limit myself. The upper portion of the semaphore 18 is stained or colored in any suitable manner with a distinct color such as red, as is clearly shown in Figs. 3 and 4. This colored area is of a more or less triangular shape with the base of the triangle at the pivotal point of the semaphore and the apex at the far end of the segment.

Figure 4:
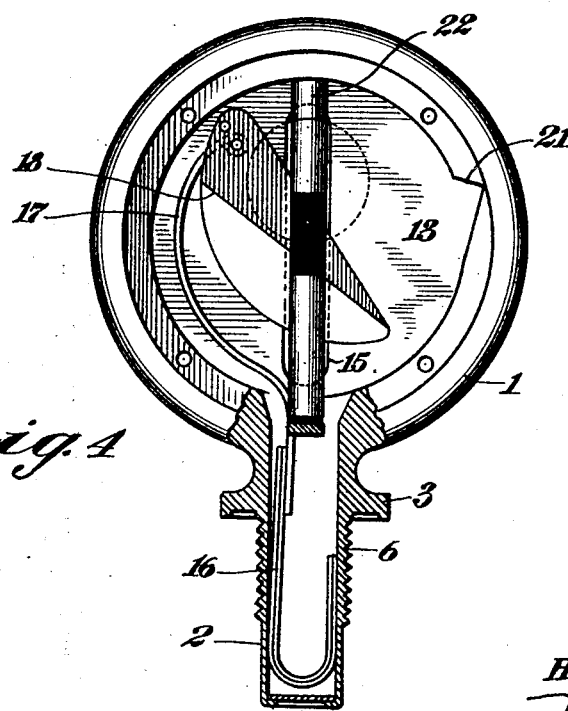
Fig. 4 is an elevational view of my device with parts broken away and shown in section and showing the indicating element displaced from its lowest point of reading.

As shown in Figs. 3 and 4, I have provided a notch 21 in the inner surface of the casing 1 in order to provide clearance to permit the semaphore 18 a greater range of swinging movement. The semaphore 18 when in its position of least heat indication does not extend across the slots 10 and 15 but lies entirely to the side thereof upon which it is pivoted. As the heat condition to which the heat responsive element 16 is subject increases, the arm 17 will be moved thus swinging the semaphore 18 about its pivot point and carrying the semaphore across the slots 10 and 15, as is clearly shown in Fig. 4. As the heat condition continues to increase the semaphore will, of course, be pivoted farther and farther about its pivot point thus carrying the same upwardly across the slots. A decrease in heat condition will cause the semaphore to swing in the reverse direction thus carrying the same downwardly in relation to the said slots 10 and 15.

A cylindrical magnifying member 22 is mounted in front of the semaphore 18 and to the rear of and in line with the slot 10 in the front dial 9. This magnifying member will therefore of course be in alinement with the slot 15 in the rear dial 13. I have illustrated this magnifying member 22 as mounted in a recess 23 in the upper portion of the casing 1 by any suitable cement and secured at its lower end within a recess 24 in the casing 1 by any suitable means. It is obvious that this magnifying element will magnify the indication given by the semaphore 18 throughout the entire indicating range thereof and that as the semaphore rises behind the member 22, it will appear similar to a column of colored fluid rising in a thermometer tube. The cylindrical member 22 may be formed solid or hollow although I prefer to use a solid rod and may be constituted of glass, bakelite, or other suitable material.

The front and rear bezels 7 and 11 are each provided with a convex light ray refracting portion 25 which may be formed integral with the said bezels or separately therefrom and secured thereto in any suitable manner. These projections as well as the bezels may be formed of glass, bakelite, or other suitable material and may be cast or molded or formed in any other suitable manner. The projections 25 are positioned in alinement with each other and also in alinement with the upper portion of the slots 10 and 15 and cover that portion of the indicating range of the semaphore 18 which corresponds to the indication of a dangerous heat condition within the automotive radiator to which my device is attached.

A peculiar result is obtained by the use of the cylindrical magnifying member 22. This result, as shown in Fig. 1 is the magnified outline of the colored portion of the semaphore 18 will always appear as bounded by parallel lines at the top and the bottom even though the semaphore 18 crosses the magnifying element at a very acute angle. The magnification of the indication is further accentuated in that region corresponding to a dangerous heat condition within an automotive radiator to which my device is attached by the projections 25, as is clearly shown in Fig. 1. The rear projection 25 serves to refract the light rays throughout this range of indication and the front projection 25 serves to further magnify the indication over the magnification produced by the member 22. It is obvious, that if desired, the front and rear dials 9 and 13 may be cut away to form circular apertures in line with the projections 25 and if desired may be graduated and inscribed in any desired manner. It is further obvious that the rear projection 25 will magnify the indication of the semaphore 18 when viewed from the rear when a dangerous heat condition exists within the automotive radiator. At other times the semaphore will, of course, lie below the projections 25 but will be readable thru the rear slot 15.

While I have described a preferred form of embodiment of my invention, it will be understood that other forms of embodiments may be used as equivalents within the scope of the appended claims and that the invention is not limited to the specific form of embodiment herein shown and described.

What I claim as my invention is:

1. In a device for indicating the heat condition within an automotive radiator, having a mechanical indicating element, a casing for housing said indicating element, and a cylindrical magnifying means within said casing and adjacent said indicating element.

2. In a device for indicating the heat condition within an automotive radiator, having a mechanical indicating element, a casing for housing said indicating element, and a cylindrical magnifying means within said casing and means for accentuating the magnification to a greater degree in that range corresponding to the indication of a dangerous heat condition within said automotive radiator.

3. In a device for indicating the heat condition within an automotive radiator, having a pivoted metallic indicating element, a casing for housing said indicating element, and a cylindrical magnifying means within said casing for converting said angular indications to parallel indications and means for further magnifying the indication throughout that portion of the indicating range corresponding to a dangerous heat condition within said automotive radiator and means for refracting light rays upon the said portion further magnified.

4. In a device for indicating the heat condition within an automotive radiator having a mechanically operated visual indicating element including a semaphore, a cylindrical magnifying means extending across the path of swinging movement of said semaphore and a front and rear dial each formed with an aperture extending parallel to said cylindrical magnifying element and in line therewith.

5. In a device for indicating the heat condition within an automotive radiator, a casing, a rear dial for said casing, a device responsive to changes in heat condition within said automotive radiator, an indicating arm operated thereby and pivoted to said dial and a cylindrical magnifying member mounted within said casing and adjacent said indicating element and extending throughout the indicating range thereof, said magnifying member apparently indicating parallel movements of said arm.

6. In a device for indicating the heat condition within an internal combustion engine cooling system, a device responsive to changes in heat condition within said system, a swinging indicating element positioned thereby, means for refracting light rays upon a portion of the path of swinging movement of said element, means for magnifying the reading in said portion, and additional means for accentuating the reading of said indicating element throughout its entire indicating range.

7. In a device for indicating the heat condition within an internal combustion engine cooling system, a device responsive to changes in heat condition within said cooling system, an indicating element positioned thereby, a housing for said indicating element, a front dial for said housing formed with an aperture therein, and a magnifying means within said housing and between said aperture and said indicating element.

8. In a device of the class described, a device responsive to changes in heat condition, an eccentrically mounted indicating arm positioned thereby, a housing for said indicating arm, a front dial for said housing formed with an aperture therein, and a magnifying means positioned in the housing at the front of said indicating arm and to the rear of and in alignment with said aperture for accentuating the reading of said indicating arm.

9. In a device of the class described, a device responsive to changes in heat condition, a pivoted mechanical indicating element positioned thereby, a housing for said indicating element, a front dial for said housing formed with a slot extending in alinement with the indicating range of said indicating element and a magnifying means positioned in said housing between said slot and said indicating element for accentuating the reading of said indicating element, and apparently causing the movement of the element to simulate fluid movement in a column.

10. In a device for indicating the heat condition within an internal combustion engine cooling system, a housing for an indicating element, a dial for said housing formed with an aperture therein, a magnifying means in the housing closely adjacent one face of said dial and in alinement with said aperture, and a solid cylindrical magnifying means closely adjacent the other face of said dial and in alinement with said aperture.

11. In a device for indicating the heat condition of an internal combustion engine cooling system, the combination of an indicating arm having a portion of its surface bearing a distinctive color, which is tapering in shape, elongated magnifying means extending along one side of said arm, and means for mounting said element to enable it to be moved to carry the opposite edges of the colored portion so as to extend across said magnifying means, the latter being of such character that the edges of the colored portion are shown through it in full transverse parallel positions.

12. In a device according to claim 11, wherein a dial is mounted adjacent the magnifying means, the dial having a slot through which the magnifying means can be seen, the dial shielding the indicating arm so that only the portion of the colored surface which extends across said slot and said magnifying means, can be perceived.

13. The device according to claim 11, having a dial with a slot therein to expose the magnifying means, the dial shielding the indicating arm so that only part of the colored surface extending across the magnifying means can be perceived, and an additional magnifying means disposed to cooperate with a portion of the first named magnifying means when a predetermined temperature is attained.

In testimony whereof I have affixed my signature to this specification.

HENRY C. HEBIG.